…

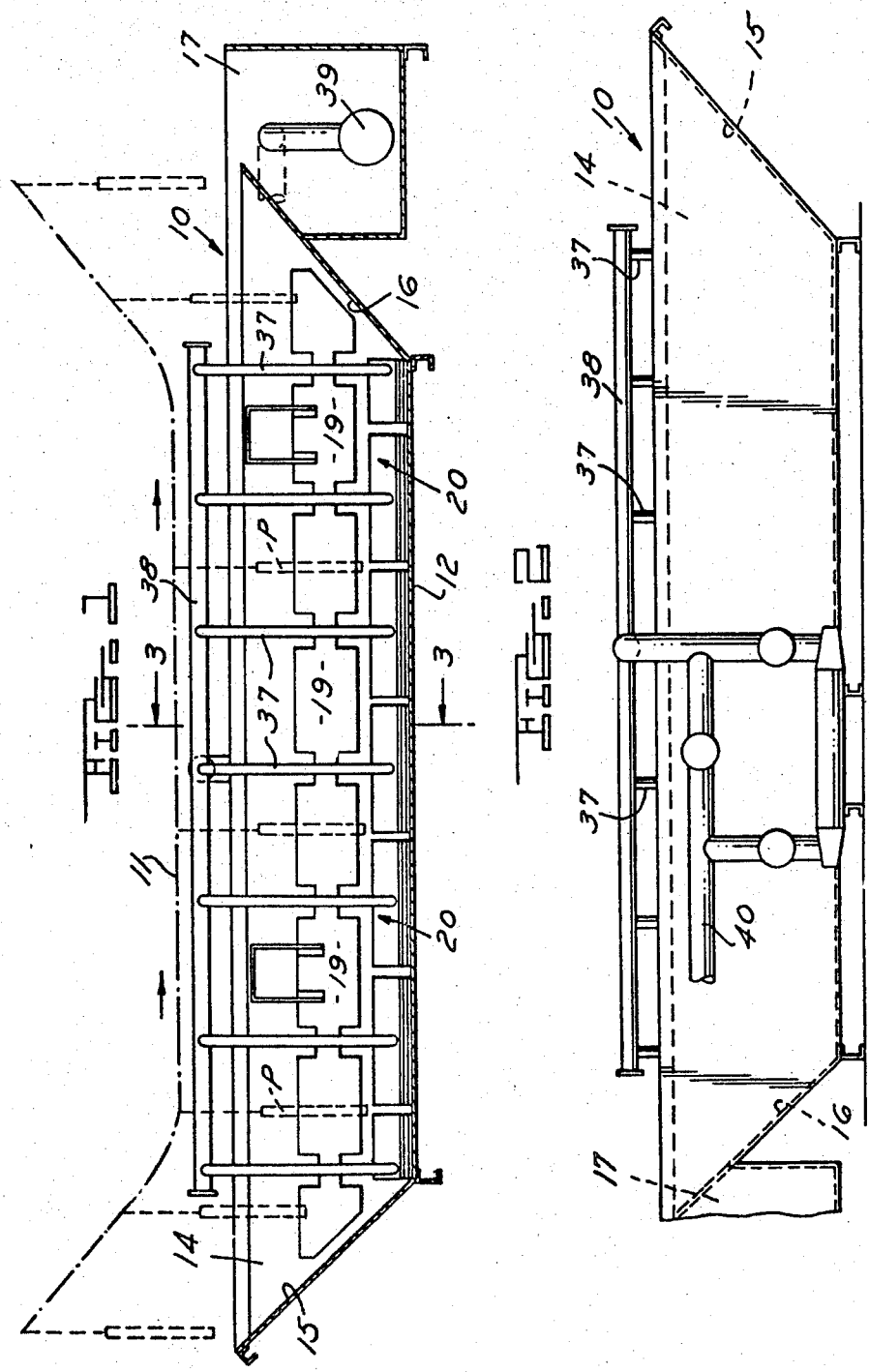

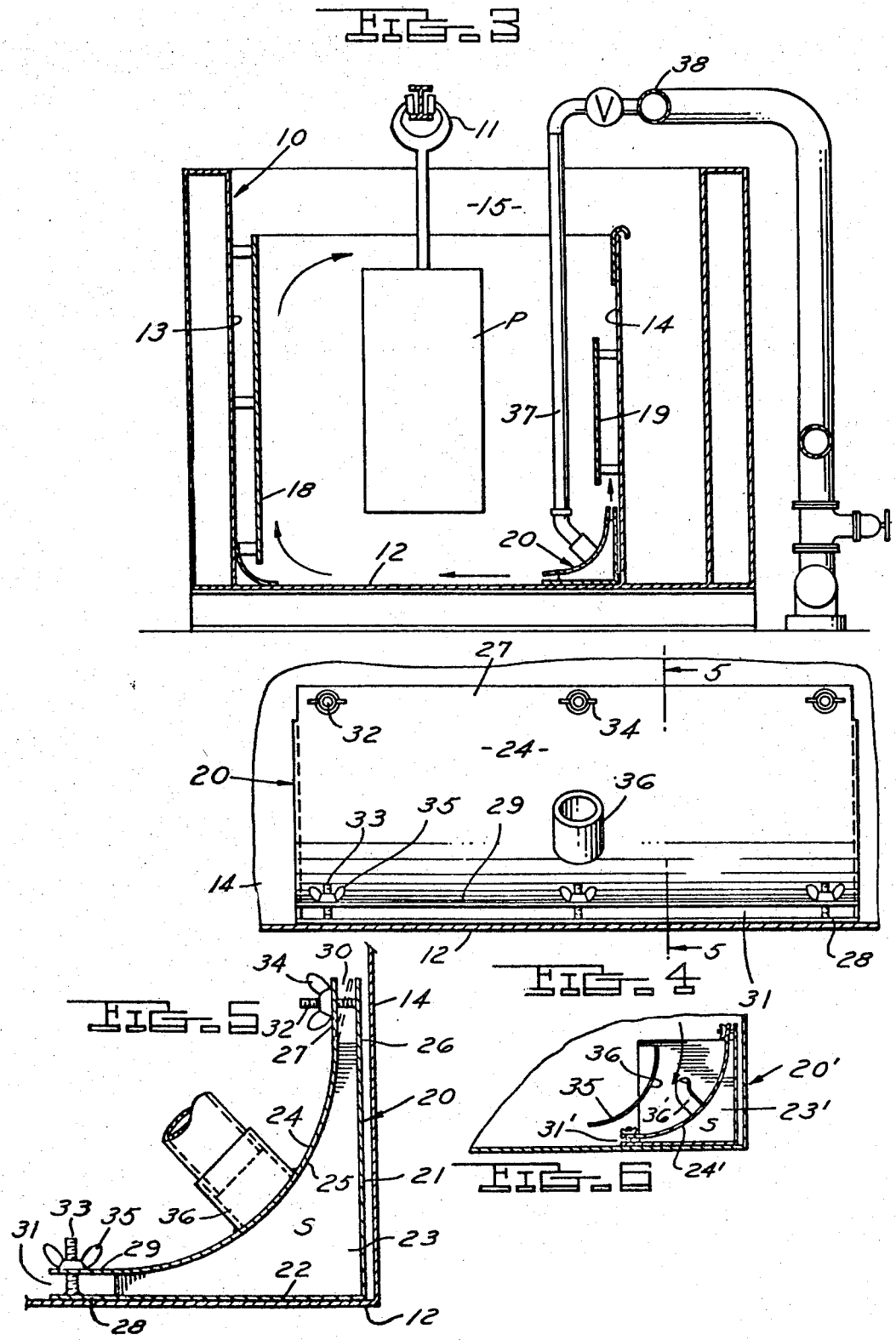

United States Patent Office 3,756,935
Patented Sept. 4, 1973

3,756,935
ELECTROPAINTING
Lyman L. Thornton, Waterford, Mich., assignor to Mahon Technology Group, Inc., Sterling Heights, Mich.
Original application Sept. 24, 1968, Ser. No. 761,930. Divided and this application Apr. 19, 1971, Ser. No. 135,348
Int. Cl. B01k 5/02; C23b 13/00
U.S. Cl. 204—181                                5 Claims

ABSTRACT OF THE DISCLOSURE

An electropainting apparatus comprising a longitudinally extending tank having a side and bottom and an overflow area. Deflector assemblies are provided at longitudinally spaced points at the areas of juncture of the side and bottom walls and liquid is introduced into the assemblies and directed by the assemblies transversely of the tank to cause a transverse circulation.

---

This application is a division of application Ser. No. 761,930, filed Sept. 24, 1968, now Pat. No. 3,592,755.

This invention relates to electropainting.

BACKGROUND OF THE INVENTION

In electropainting, the parts to be coated are moved through a tank containing the paint and the paint is applied to the parts by electrodeposition commonly known as electrophoresis. One of the most difficult problems in connection with such a process is the production of a continuous circulation so that the paint will remain properly mixed and will not build up or accumulate on the projecting parts or portions of the apparatus.

Among the objects of the present invention are to provide a method and apparatus for producing a transverse circulation; which is relatively simple, easily constructed and readily applied to conventional electropainting tanks.

DESCRIPTION OF THE DRAWINGS

FIG. 1 is a side elevational view of an electropainting apparatus embodying the invention.

FIG. 2 is a side elevational view from the opposite side.

FIG. 3 is a transverse sectional view on an enlarged scale taken along the line 3—3 in FIG. 1.

FIG. 4 is a fragmentary plan view on an enlarged scale of a portion of the apparatus.

FIG. 5 is a fragmentary sectional view taken along the line 5—5 in FIG. 4.

FIG. 6 is a sectional view similar to FIG. 5 showing a modified form of the invention.

DESCRIPTION

Referring to FIGS. 1 and 2, the electropainting apparatus embodying the invention comprises a tank 10 containing paint through which the parts P (FIG. 1) to be coated are moved by a conveyor 11.

As shown in FIG. 3, the tank 10 comprises a bottom wall 12, side walls 13, 14 and tapered end walls 15, 16, the latter extending into an overflow area 17 (FIG. 2). The tank further includes electrodes 18, 19 in accordance with conventional construction. The apparatus heretofore described is conventional.

In accordance with the invention, deflector assemblies 20 are provided at longitudinally spaced points in the tank at the area of juncture of the side wall 14 and bottom wall 12.

As shown in FIGS. 4 and 5, each deflector assembly includes a vertical wall 21 and a horizontal wall 22, end walls 23 joined to the vertical wall 21 and horizontal wall 22 and a deflector wall 24 joined to the end walls 23. The deflector wall 24 is curved to form a concave surface 25 facing inwardly of the deflector. Portions 26, 27 and 28, 29 of the walls and deflector extend beyond the end walls to provide a space 30, 31. Bolts 32, 33 are fixed to the walls 21, 22 and extend through an opening in the portions 27, 29. Wing nuts 34, 35 are threaded on each bolt 32, 33. The portions 27, 29 are made of a spring material such as sheet metal so that by tightening or loosening the wing nuts 34, 35, the width of the spaces 30, 31 can be varied.

Each deflector wall 24 has a generally radial inlet 36. A pipe 37 is connected to each inlet 36 and extends vertically upwardly to a header 38. Liquid is removed from the overflow area 17 by a pump 39 and provided to the header 38 through a pipe 40.

In use, the paint removed from the overflow area is supplied to the header and flows downwardly through the pipes 37 into the space S of each deflector assembly 20 and thereafter outwardly through opening 31 generally transversely and parallel to the bottom wall 12. This flow produces a transverse circulation in the manner of the arrow shown in FIG. 3. A lesser portion of the paint is directed upwardly to space 30 along the wall 14 to prevent the accumulation or deposition of paint along this wall 14.

It has been found that the transverse circulation caused by the deflector assemblies 20 produces an effective means for circulating the paint while permitting a slow longitudinal overflow into the tank area 17.

The use of individual deflector assemblies 20 permits the addition of the circulating apparatus to tanks which have been previously fabricated. The number of deflector assemblies 20 can be adjusted by removing or adding assemblies in order to produce the desired circulation.

In the form of the invention shown in FIG. 6, the end walls 23' of the deflector assembly 20' extend beyond the deflector wall 24' and support an auxiliary deflector wall 35 in spaced relation to the space 31' and the lower outer surface of the deflector wall 24'. The auxiliary deflector 35 is made of substantially uniformly thick material and curved to provide a convex surface 36 adjacent the lower outer surface of the deflector 24' and the space 31'.

The transverse circulation of liquid caused by the deflector assembly 20' in the manner previously described produces a flow of paint between the auxiliary deflector 35 and the main deflector 24'. This flow tends to induce or aspirate a further flow or circulation of paint out of the space S thus further facilitating the transverse circulation.

I claim:

1. The method of electropainting articles which comprises moving the articles through a tank containing paint and having spaced side walls joined to a bottom wall along longitudinal areas of juncture, and producing circulation of the paint by introducing a portion of the paint adjacent to an area of juncture of one side wall and the bottom wall and directing said paint so introduced along the bottom wall transversely thereof away from the area of juncture toward the area of juncture of the other side wall and the bottom wall.

2. The method set forth in claim 1 including the step of directing a portion of the paint upwardly along the one side wall away from the first-mentioned area of juncture.

3. The method set forth in claim 2 including the step of causing said paint to move upwardly along the other side wall away from said second-mentioned area of juncture.

4. The method set forth in claim 1 including a step of inducing a secondary circulation of the liquid so introduced adjacent the bottom wall of the tank away from the first-mentioned area of juncture.

5. The method set forth in claim 1 wherein said steps are performed at longitudinally spaced points along said first-mentioned area of juncture.

References Cited
UNITED STATES PATENTS
3,496,082   2/1970   Orem et al. _____ 204—181

HOWARD S. WILLIAMS, Primary Examiner